(12) United States Patent
Noddings et al.

(10) Patent No.: US 6,336,120 B1
(45) Date of Patent: Jan. 1, 2002

(54) METHOD AND SYSTEM FOR SUPPORTING HIERARCHICAL STORAGE MANAGEMENT (HSM) FILE SYSTEM ACROSS MULTIPLE PLATFORMS

(75) Inventors: Douglas Stephen Noddings, San Jose, CA (US); Matthew Joseph Anglin, Vail, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/918,358

(22) Filed: Aug. 26, 1997

(51) Int. Cl.[7] .............................................. G06F 17/30
(52) U.S. Cl. ...................... 707/200; 707/10; 709/319
(58) Field of Search ........................ 707/10.1, 10, 100, 707/200–205; 709/311–313, 319–321, 325; 713/1.2; 717/11

(56) References Cited

U.S. PATENT DOCUMENTS

| 5,371,885 A | * 12/1994 | Letwin .......................... 707/205 |
| 5,459,867 A | * 10/1995 | Adams et al. ................. 709/301 |
| 5,557,740 A | * 9/1996 | Johnson et al. ........... 395/183.14 |
| 5,623,696 A | * 4/1997 | Johnson et al. .............. 395/681 |
| 5,640,562 A | * 6/1997 | Wold et al. ...................... 713/2 |
| 5,815,415 A | * 9/1998 | Bentley et al. ................. 703/4 |
| 5,854,927 A | * 12/1998 | Gelissen ........................ 717/5 |
| 5,901,319 A | * 5/1999 | Hirst ........................... 717/10 |
| 5,937,406 A | * 8/1999 | Balabine et al. ............. 707/100 |
| 5,970,490 A | * 10/1999 | Morgenstern ................. 707/10 |
| 6,035,396 A | * 3/2000 | Thompson et al. ............. 713/2 |

* cited by examiner

Primary Examiner—Maria N. Von Buhr
(74) Attorney, Agent, or Firm—Sawyer Law Group LLP; Noreen A. Krall

(57) ABSTRACT

Method and system aspects for supporting hierarchical file system management functions across multiple operating system platforms in a data processing system are provided. In these aspects, a code base provides predetermined functionality for each of a plurality of operating system platforms of the data processing system. Further, a common kernel extension is utilized by the code base, with the common kernel extension supporting a hierarchical file system of the data processing system. The common kernel extension supports file system intervention in the hierarchical file system by handling an interface between each operating system platform and a file system. Also, the common kernel extension further handles an interface between each operating system platform and a device driver.

16 Claims, 3 Drawing Sheets

METHOD AND SYSTEM FOR SUPPORTING HIERARCHICAL STORAGE MANAGEMENT (HSM) FILE SYSTEM ACROSS MULTIPLE PLATFORMS

FIELD OF THE INVENTION

The present invention relates generally to operating system platforms, and more particularly to support for a hierarchical storage management system that functions across multiple operating system platforms.

BACKGROUND OF THE INVENTION

In many data processing systems, files are stored according to a hierarchical storage management (HSM) file system. For example, an HSM file system is often employed in systems with a version of the UNIX operating system. Typically, operating system HSM extensions are required to support the HSM file system. The specific functions required through the extensions often vary from one operating system implementation, e.g., one UNIX implementation, to another. For systems operating with the UNIX operating system, the extensions that provide the support normally include a pseudo device driver extension and virtual file system function. Thus, the extensions provide further functionality to the functions performed by the kernel of the operating system. Typically, the kernel manages the machine's memory and allocates it to each process, and schedules the work done by the system's central processor, so that the work of each user is carried out as efficiently as is possible.

With the variations in specific functions among UNIX implementations, separate code modules result for each operating system supported by the data processing system. Each code module in turn typically requires approximately twenty thousand lines of code for each extension of the module. Unfortunately, the variations in the code modules creates several difficulties. For example, maintenance efforts are increased when coordinating the addition of features and fixing of defects in the separate code modules. Further, completely new instantiations result when porting to additional operating systems. Inefficiency also results due to the duplication of efforts to provide code that has common functionalities across each of the modules.

Accordingly, what is needed is a common code kernel extension with file system intervention that functions across multiple operating system platforms in a computer system.

SUMMARY OF THE INVENTION

These needs are met through the present invention which provides method and system aspects for supporting hierarchical file system management functions across multiple operating system platforms in a data processing system.

With the present invention, there is only one code base that is largely shared code across all supported operating system platforms. Thus, reduced maintenance costs and more rapid introductions of new features result. Further, the present invention facilitates cross platform ports of the code data by clearly differentiating between shared and platform specific code. These and other advantages of the aspects of the present invention will be more fully understood in conjunction with the following detailed description and accompanying drawings.

DESCRIPTION OF THE INVENTION

The present invention relates to common code for kernel extensions and file system intervention across multiple platforms in a data processing system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
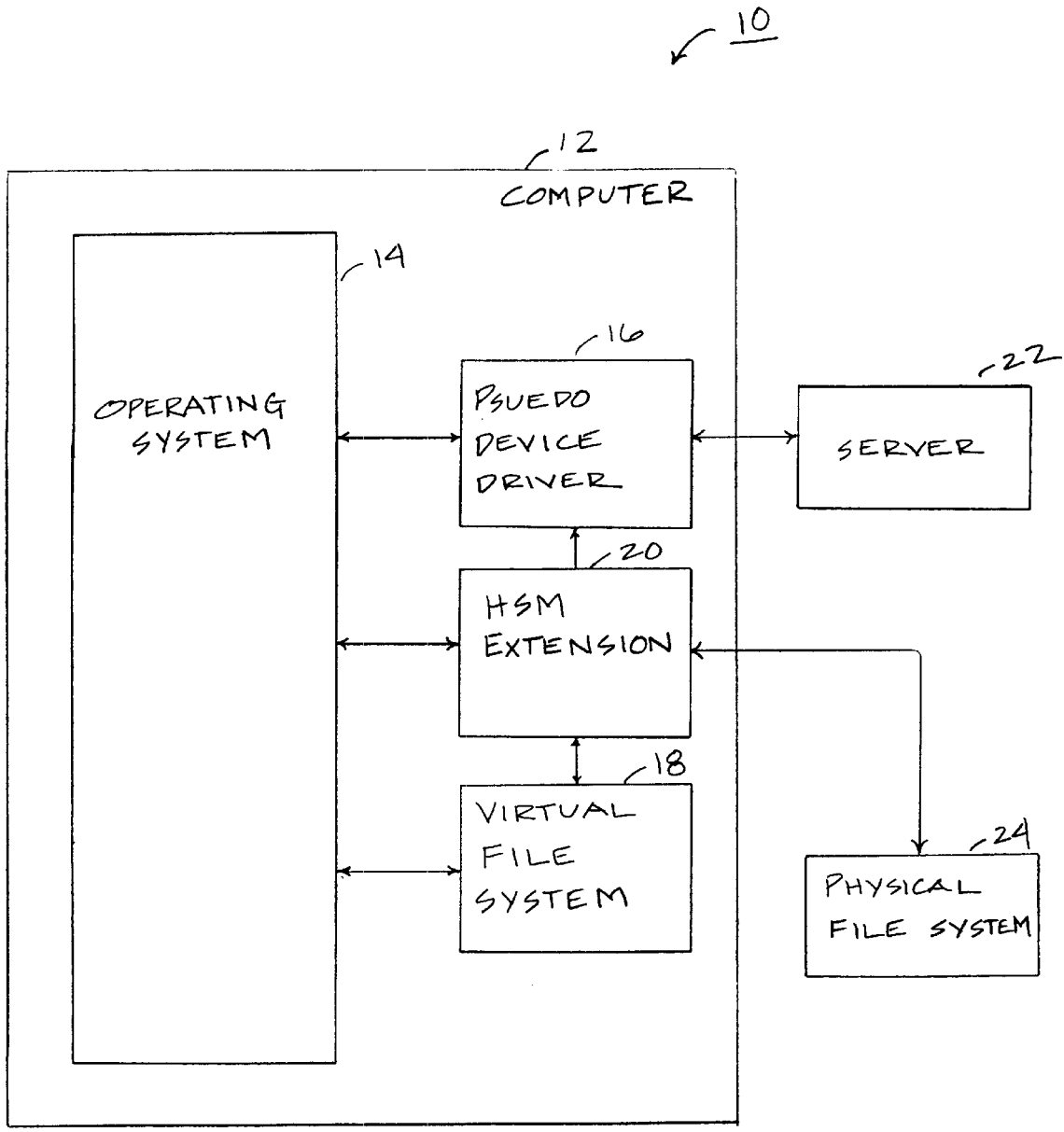
FIG. 1 illustrates a block diagram of a conventional operating system environment including an HSM file system extension.

FIG. 1 illustrates a data transfer system 10. The system 10 suitably includes a computer 12 with an associated operating system 14. In a preferred embodiment, the computer 12 is a type RISC System/6000 or HP 900 or SUN computer and the operating system 14 is an AIX, HP/UX, or Solaris operating system. Also included in system 12 are pseudo device driver 16, virtual file system 18, HSM extension 20, server, 22, and physical file system 24.

Typically, file system operations or input/output control (ioctl) operations, e.g., open, read, write, and close, occur via the operating system 14 to the virtual file system 18. The virtual file system 18 suitably interacts with the physical file system 24 via the HSM extension 20 for each ioctl. Other HSM commands, e.g., migrate and recall, also occur in parallel with the file system operations.

By way of example, in operation, when a recall command is supplied by a user, i.e., a user opens a file and attempts to read the file, a read operation is suitably signalled to the virtual file system 18 from the operating system 14. The virtual file system 18 then passes the request to the HSM extension 20. When the HSM extension 20 determines that the file is not located on the physical file system 24, the HSM extension 20 proceeds to signal the pseudo device driver 16 to have an HSM daemon process retrieve the file from the server 22 to give the file back to the HSM extension 20. Once the HSM extension 20 gets the file back from the pseudo device driver 16, the HSM extension 20 suitably provides the file to the physical file system 24, which finally returns the file as the recall data. Thus, several processes occur within system 10 in performing HSM commands.

Figure 2:
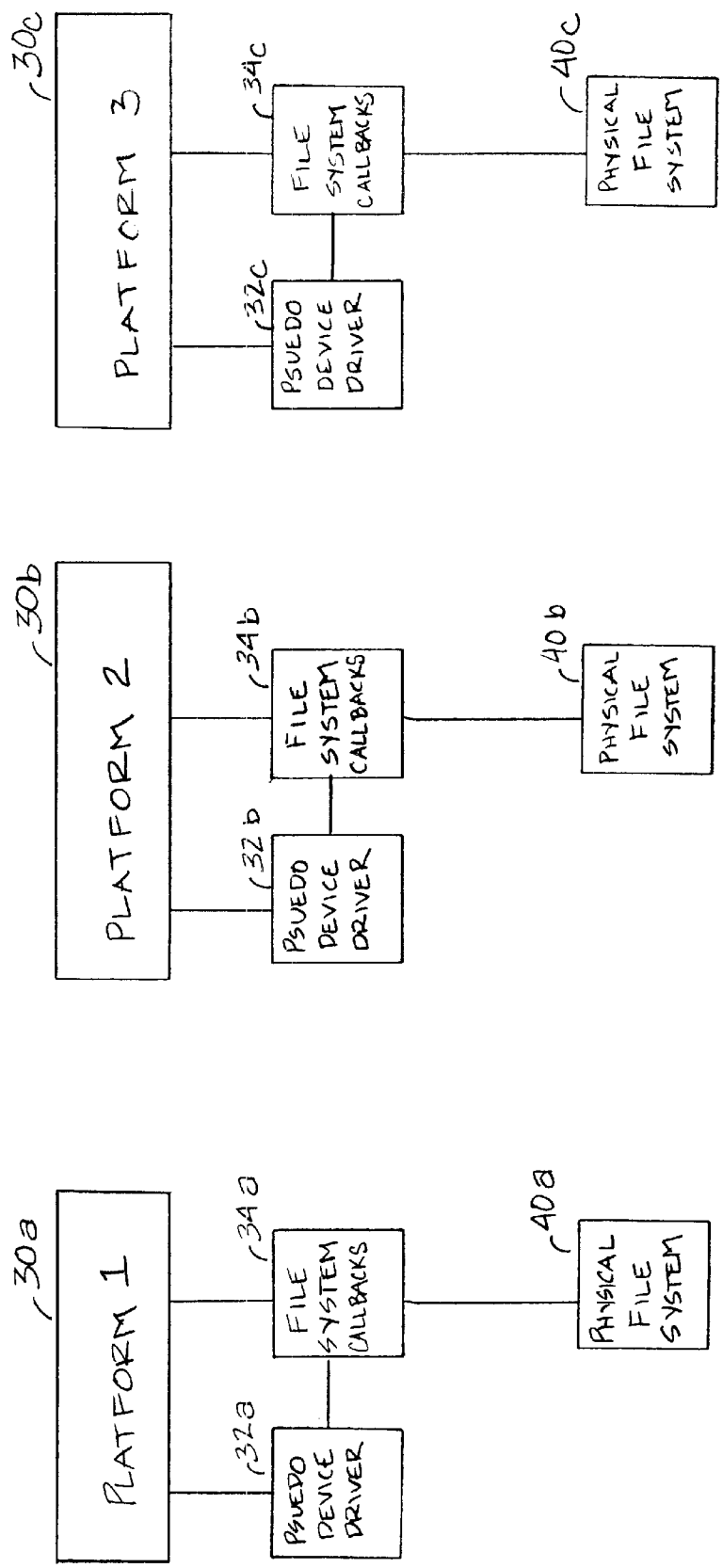
FIG. 2 illustrates a block diagram of utilization of pseudo device drivers and file system callbacks over multiple operating system platforms.

In a system supporting more than one operating system platform, each operating system platform 30 interfaces with a pseudo device driver 32 and file system callbacks 34, as shown in FIG. 2. Of course, in a multiplatform environment, each platform 30a, 30b, and 30c would include its own version of the pseudo device driver 32a, 32b, and 32c, as well as its own version of file system callbacks 34a, 34b, and 34c. It should be appreciated that although FIG. 2 depicts three platforms, this is meant to be illustrative and not restrictive of the environment suitable for the present invention, so that other numbers and combinations of platforms are possible without departing from the spirit and scope of the present invention.

Typically, the activity of the pseudo device driver 32 of a given platform 30 is to handle commands and daemons. The pseudo device driver 32 further interfaces with the file system callbacks 34 through signalling and locking mechanisms when necessary during the daemon or command processing, as is well appreciated by those skilled in the art.

The file system callbacks 34 typically include virtual file system (VFS) callbacks, e.g., mount/unmount, and virtual node (VN) callbacks, e.g., seek, set attribute, open/close a specific file, etc., that occur as a result of user file system activity. The file system callbacks 34 therefore interface with the physical file system 40 that includes the virtual node and virtual file system.

Figure 3:
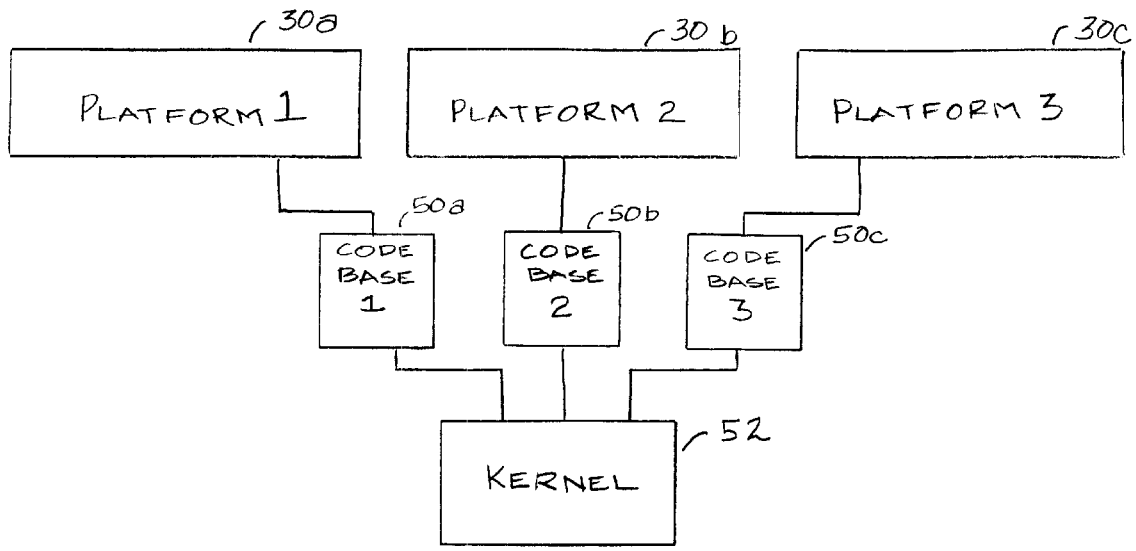
FIG. 3 illustrates a block diagram of utilization of common kernel extension code in accordance with the present invention.

With the present invention, much of the common functionality of the interfaces for each platform 30a, 30b, 30c with the pseudo device driver 32a, 32b, 32c and the file system callbacks 34a, 34b, 34c portions of a data processing system are provided as a common code kernel extension with file system intervention. Thus, as shown in FIG. 3, in the present invention, each platform 30a, 30b and 30c maintains its own base code 50a, 50b, and 50c for platform specific functionality, but all share a kernel extension 52 that handles common functionality for the file system activities in the system, as described above. Preferably, the base code 50 for each platform 30 comprises operating system specific code. Suitably, the base code 50 is a combination of operating specific routines, macros, and #ifdef'ed code, with the specific code varying depending on the needs of the specific platform and provided by coding techniques which are well understood by those skilled in the art.

Preferably, the shared code of the kernel extension 52 is clearly differentiated from the base code 50 of each platform 30. For example, routines such as $PS_{trace}$ for tracing to platform specific repository could provide that differentiation.

With the clear differentiation between the common code kernel extension 52 and base code 50, maintenance changes are more readily automatically applied to all the platforms 30, if the changes are a part of the kernel extension 52. Such ease of performing changes reduces expenses and results in a more reliable vehicle for assuring that changes are applied across all of the platforms supported by the kernel extension 52. Further, porting the kernel extension 52 to additional platforms is efficiently facilitated through the differentiation between shared and platform specific code.

Figure 4:
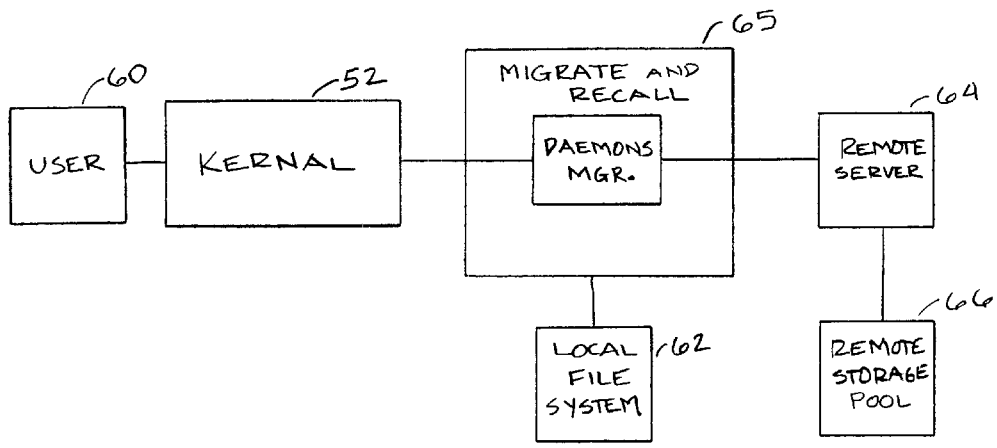
FIG. 4 illustrates a block diagram of user interaction with a data processing system utilizing common kernel extension code in accordance with the present invention.
Figure 1:
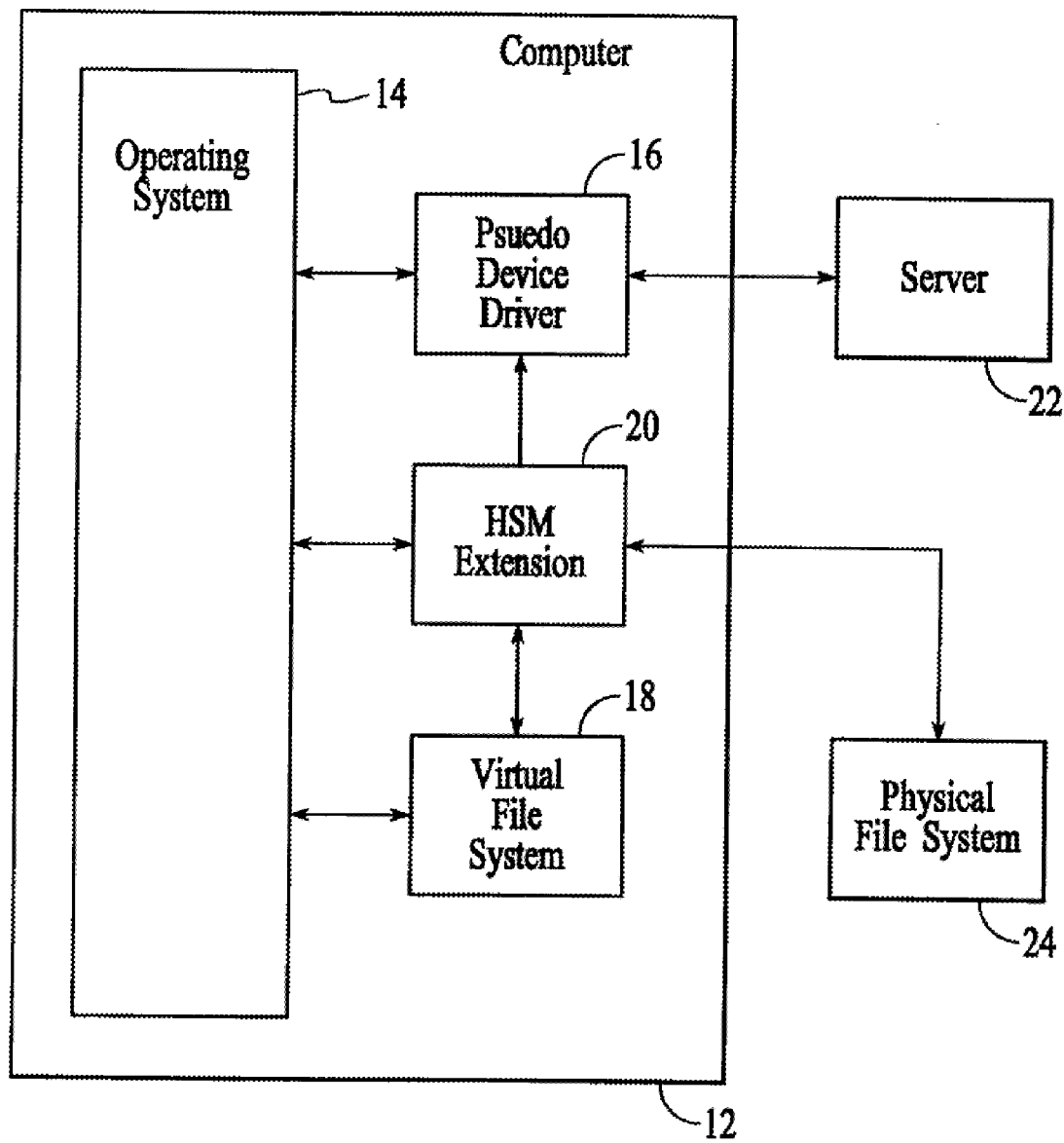
Figure 2:
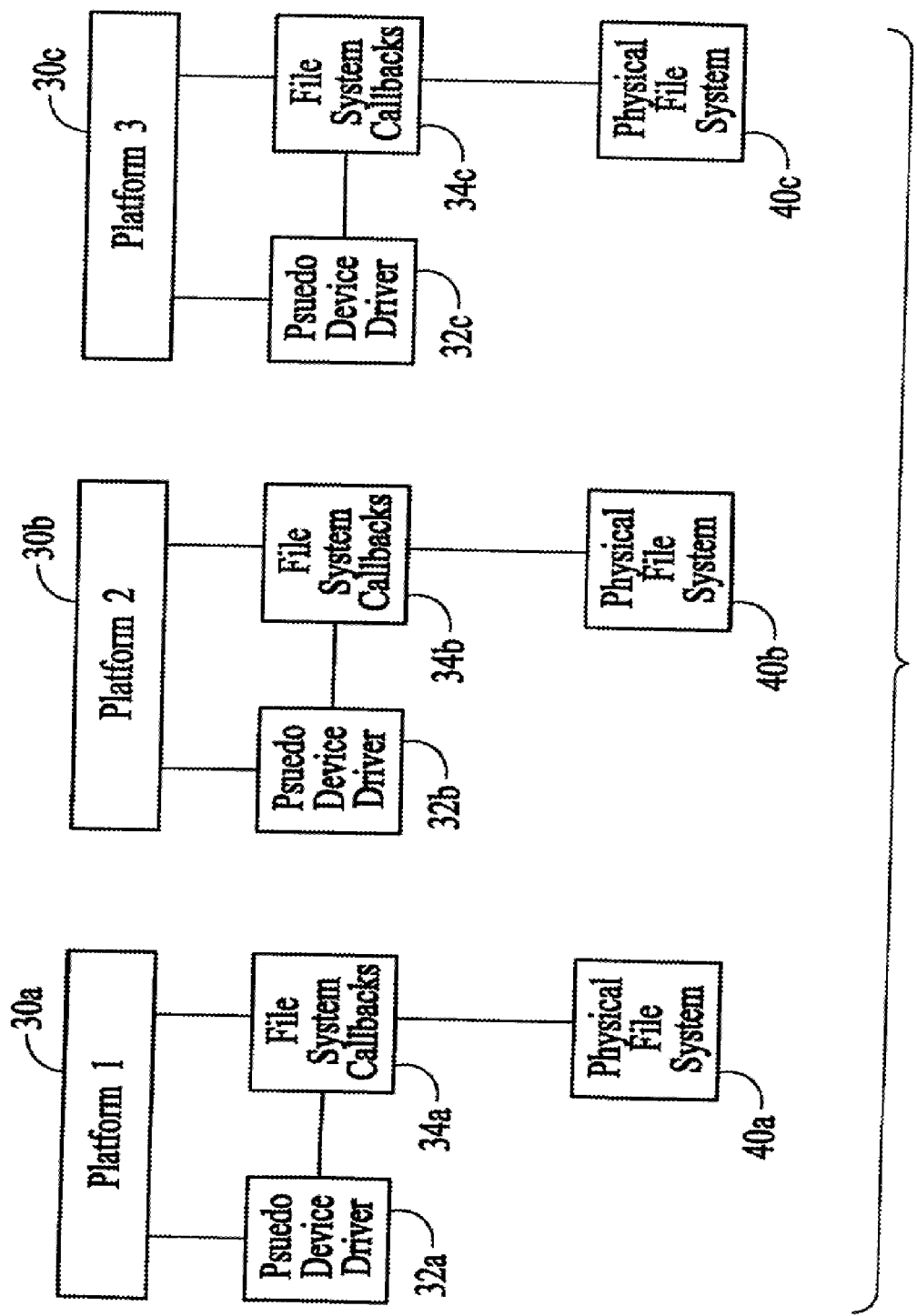
Figure 3:
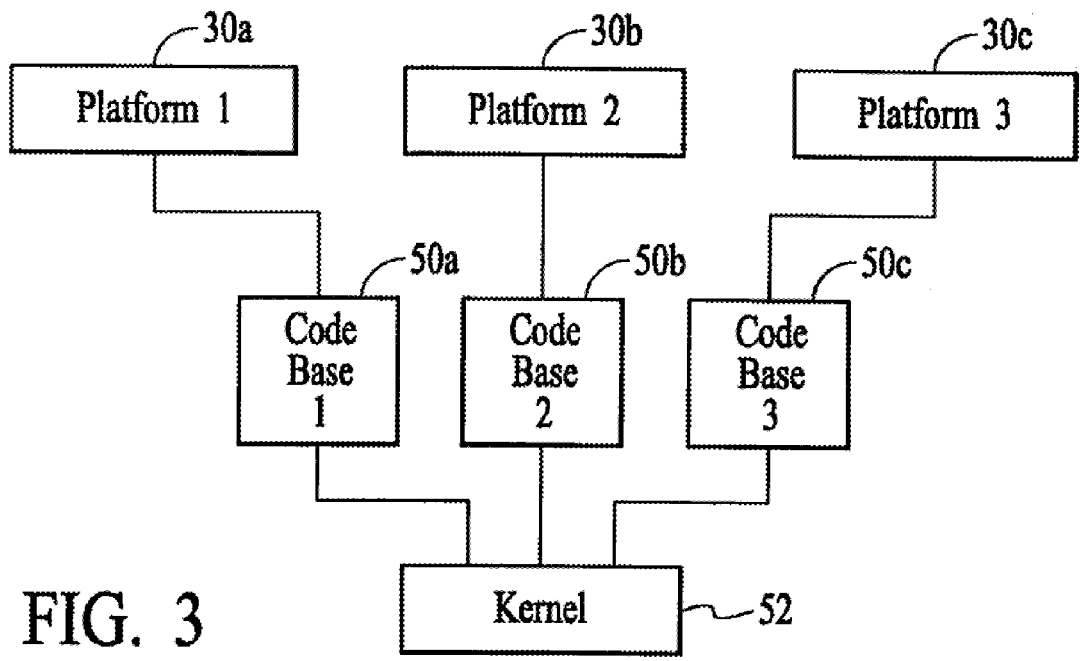
Figure 4:
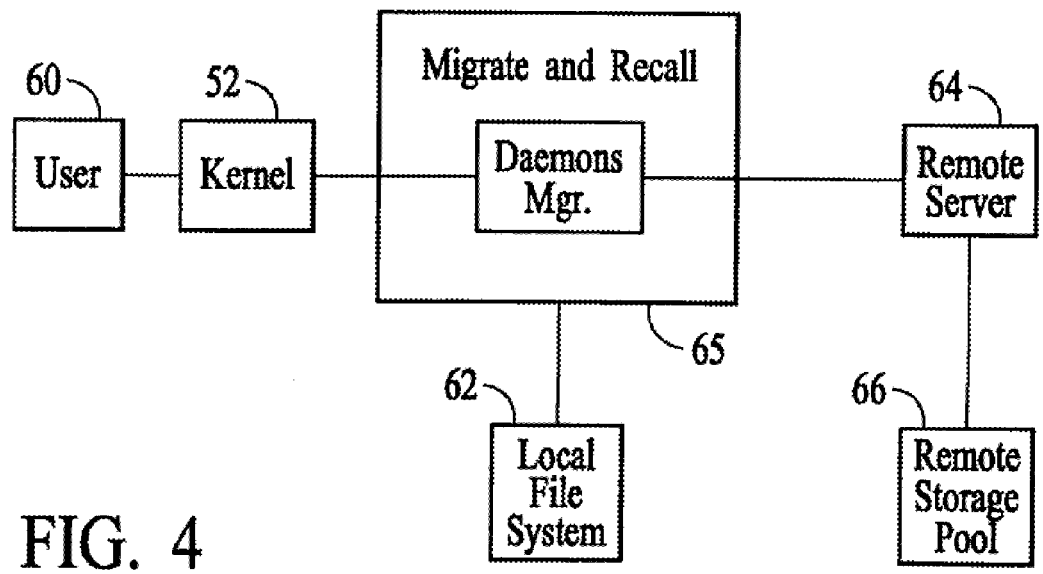

Overall, the common code providing the kernel extension and the file system intervention in accordance with the present invention achieves less duplicative efforts. By way of example, the number of lines of code required in the base code is significantly reduced, e.g., from forty thousand lines to twenty-five thousand lines, when the common code is utilized. The utilization of the common code suitably remains transparent to a system's user, as shown in FIG. 4. A user 60 interacting with the system, such as to open/retrieve a file, remains unaware of whether the file is on a local file system 62 or accessed via migrate and recall daemons 65 from a remote server 64, e.g. an ADSM server, accessing a remote storage pool 66. Through the present invention, the kernel extension 52 providing the shared code and file system intervention ensures that the interface activities, as described with reference to FIG. 2, occur properly in each given platform.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

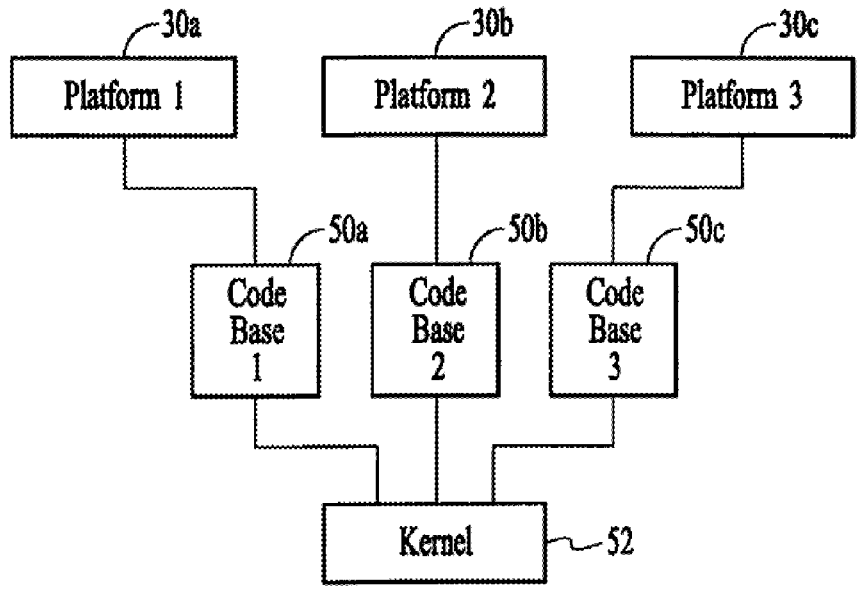

What is claimed is:

1. A method for supporting a hierarchical storage management (HSM) file system across multiple operating system platforms in a data processing system, the method comprising:

providing a base code for platform specific operations in each of a plurality of operating system platforms of the data processing system; and utilizing a common code across the plurality of operating system platforms to support a hierarchical file system of the data processing system by providing common functionality of chosen interfaces utilized for hierarchical storage management of the hierarchical file system for the plurality of operating systems.

2. The method of claim 1 wherein the common code further comprises a kernel extension.

3. The method of claim 2 wherein the kernel extension supports file system intervention in the hierarchical file system.

4. The method of claim 3 wherein the kernel extension handles an interface between each operating system platform and a file system.

5. The method of claim 4 wherein the interface with the file system further comprises file system callbacks.

6. The method of claim 5 wherein the file system callbacks further comprise virtual file system callbacks and virtual node callbacks.

7. The method of claim 2 wherein the kernel extension handles an interface between each operating system platform and a device driver.

8. The method of claim 7 wherein the interface with the device driver further comprises an interface with a pseudo device driver.

9. The method of claim 8 wherein the pseudo device driver further interfaces with the file system through signalling and locking mechanisms.

10. The method of claim 1 further comprising providing differentiation between the base code and the common code in each of the plurality of operating system platforms.

11. The method of claim 1 wherein the operating system platforms further comprise UNIX platforms.

12. A system for supporting a hierarchical storage management (HSM) file system across multiple operating system platforms in a data processing system, the system comprising:

a code base providing predetermined functionality for each of a plurality of operating system platforms of the data processing system; and a common kernel extension utilized by the code base, the common kernel extension supporting a hierarchical file system of the data processing system and providing common functionality of chosen interfaces utilized for hierarchical storage management of the hierarchical file system for the plurality of operating system platforms.

13. The system of claim 12 wherein the common kernel extension supports file system intervention in the hierarchical file system by handling an interface between each operating system platform and a file system.

14. The system of claim 13 wherein the interface with the file system further comprises file system callbacks, virtual file system callbacks, and virtual node callbacks.

15. The system of claim 12 wherein the common kernel extension further handles an interface between each operating system platform and a device driver.

16. The system of claim 15 wherein the interface with the device driver further comprises an interface with a pseudo device driver.

* * * * *

UNITED STATES PATENT AND TRADEMARK OFFICE
CERTIFICATE OF CORRECTION

PATENT NO.        : 6,336,120 B1
APPLICATION NO. : 08/918358
DATED             : January 1, 2002
INVENTOR(S)       : Douglas Stephen Noddings It is certified that error appears in the above-identified patent and that said Letters Patent is hereby corrected as shown below:

The Title page, showing the illustrative figure, should be deleted and substitute therefor the attached Title page.

Delete drawings sheets 1-3 and substitute therefor the drawing sheets, consisting of figs. 1-4 as shown on the attached page.

Signed and Sealed this

Twenty-fifth Day of March, 2008

JON W. DUDAS
*Director of the United States Patent and Trademark Office*

(12) United States Patent
Noddings et al.

(10) Patent No.: US 6,336,120 B1
(45) Date of Patent: Jan. 1, 2002

(54) METHOD AND SYSTEM FOR SUPPORTING HIERARCHICAL STORAGE MANAGEMENT (HSM) FILE SYSTEM ACROSS MULTIPLE PLATFORMS

(75) Inventors: Douglas Stephen Noddings, San Jose, CA (US); Matthew Joseph Anglin, Vail, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/918,358

(22) Filed: Aug. 26, 1997

(51) Int. Cl.$^7$ .............................................. G06F 17/30
(52) U.S. Cl. ........................ 707/200; 707/10; 709/319
(58) Field of Search .......................... 707/10.1, 10, 100, 707/200–205; 709/311–313, 319–321, 325; 713/1.2; 717/11

(56) References Cited

U.S. PATENT DOCUMENTS

| | | | |
|---|---|---|---|
| 5,371,885 A | * 12/1994 | Letwin | 707/205 |
| 5,459,867 A | * 10/1995 | Adams et al. | 709/301 |
| 5,557,740 A | * 9/1996 | Johnson et al. | 395/183.14 |
| 5,623,696 A | * 4/1997 | Johnson et al. | 395/681 |
| 5,640,562 A | * 6/1997 | Wold et al. | 713/2 |
| 5,815,415 A | * 9/1998 | Bentley et al. | 703/4 |
| 5,854,927 A | * 12/1998 | Gelissen | 717/5 |
| 5,901,319 A | * 5/1999 | Hirst | 717/10 |
| 5,937,406 A | * 8/1999 | Balabine et al. | 707/100 |
| 5,970,490 A | * 10/1999 | Morgenstern | 707/10 |
| 6,035,396 A | * 3/2000 | Thompson et al. | 713/2 |

* cited by examiner

*Primary Examiner*—Maria N. Von Buhr
(74) *Attorney, Agent, or Firm*—Sawyer Law Group LLP; Noreen A. Krall

(57) ABSTRACT

Method and system aspects for supporting hierarchical file system management functions across multiple operating system platforms in a data processing system are provided. In these aspects, a code base provides predetermined functionality for each of a plurality of operating system platforms of the data processing system. Further, a common kernel extension is utilized by the code base, with the common kernel extension supporting a hierarchical file system of the data processing system. The common kernel extension supports file system intervention in the hierarchical file system by handling an interface between each operating system platform and a file system. Also, the common kernel extension further handles an interface between each operating system platform and a device driver.

16 Claims, 3 Drawing Sheets